June 26, 1962  M. FUNKHOUSER  3,041,061
TELESCOPING HYDRAULIC SHOCK ABSORBER
Filed May 19, 1959

INVENTOR.
Mearick Funkhouser
BY
D. C. Staley
HIS ATTORNEY

United States Patent Office 3,041,061
Patented June 26, 1962

3,041,061
TELESCOPING HYDRAULIC SHOCK ABSORBER
Mearick Funkhouser, Dayton, Ohio, assignor to General Motors Corporation, Detroit, Mich., a corporation of Delaware
Filed May 19, 1959, Ser. No. 814,211
6 Claims. (Cl. 267—8)

This invention relates to shock absorbers adapted for connection between the sprung mass or chassis of a vehicle and the unsprung mass or wheel system of the vehicle. More particularly, the invention relates to a direct-acting type shock absorber.

With the trend in motor vehicles being toward lower silhouettes, the clearance provided between the sprung mass or chassis of the vehicle and the unsprung mass or wheel system of the vehicle is being reduced, and while the wheel movement relative to the chassis is also reduced, it is not necessarily in the same amount. This results in less space being available for shock absorber installation.

The space required for shock absorber installation, as far as length is concerned, is the sum of the active and inactive portions of the shock absorber. The active part is that required by the relative movement of the sprung and unsprung masses and is usually referred to as the stroke of the shock absorber, while the inactive part is the difference in length between the stroke and the overall length of the shock absorber which must be included between the appropriate mounting parts of the sprung and unsprung members and is known as the dead length of the shock absorber. When the sprung and unsprung members are in their closest relationship, there must be sufficient clearance provided between these mounting parts to contain the sum of the active and inactive lengths of the shock absorber. In other words, the sum of the active and inactive lengths of the shock absorber must be sufficiently short as to fit within the clearance allowed between the sprung and unsprung members.

It is, therefore, an object of this invention to provide a direct-acting type shock absorber that is capable of providing a larger ratio between the active and inactive parts of the shock absorber. To obtain this result, it is an object of the invention to use a telescoping shock absorber having dual-acting cylinders and pistons of different diameters constructed and arranged in a manner that the small diameter piston and cylinder operate independently of the larger diameter piston and cylinder for a predetermined part of the full stroke of the shock absorber, the two pistons working concurrently during a part of the stroke so that a larger stroke to dead length ratio is obtained than is possible with a conventional shock absorber.

It is another object of the invention to provide a direct-acting type shock absorber that will accomplish the results of the foregoing objects wherein the small diameter piston of the shock absorber engages the large diameter piston at a predetermined point in the stroke of the unit, the pistons being constructed and arranged in a manner to provide for a hydraulic cushion between the pistons during the period of time the pistons are being brought into engagement, thereby lessening the magnitude of the accelerations due to physical engagement of the pistons.

Further objects and advantages of the present invention will be apparent from the following description, reference being had to the accompanying drawings wherein preferred embodiments of the present invention are clearly shown.

Figures 1, 2:
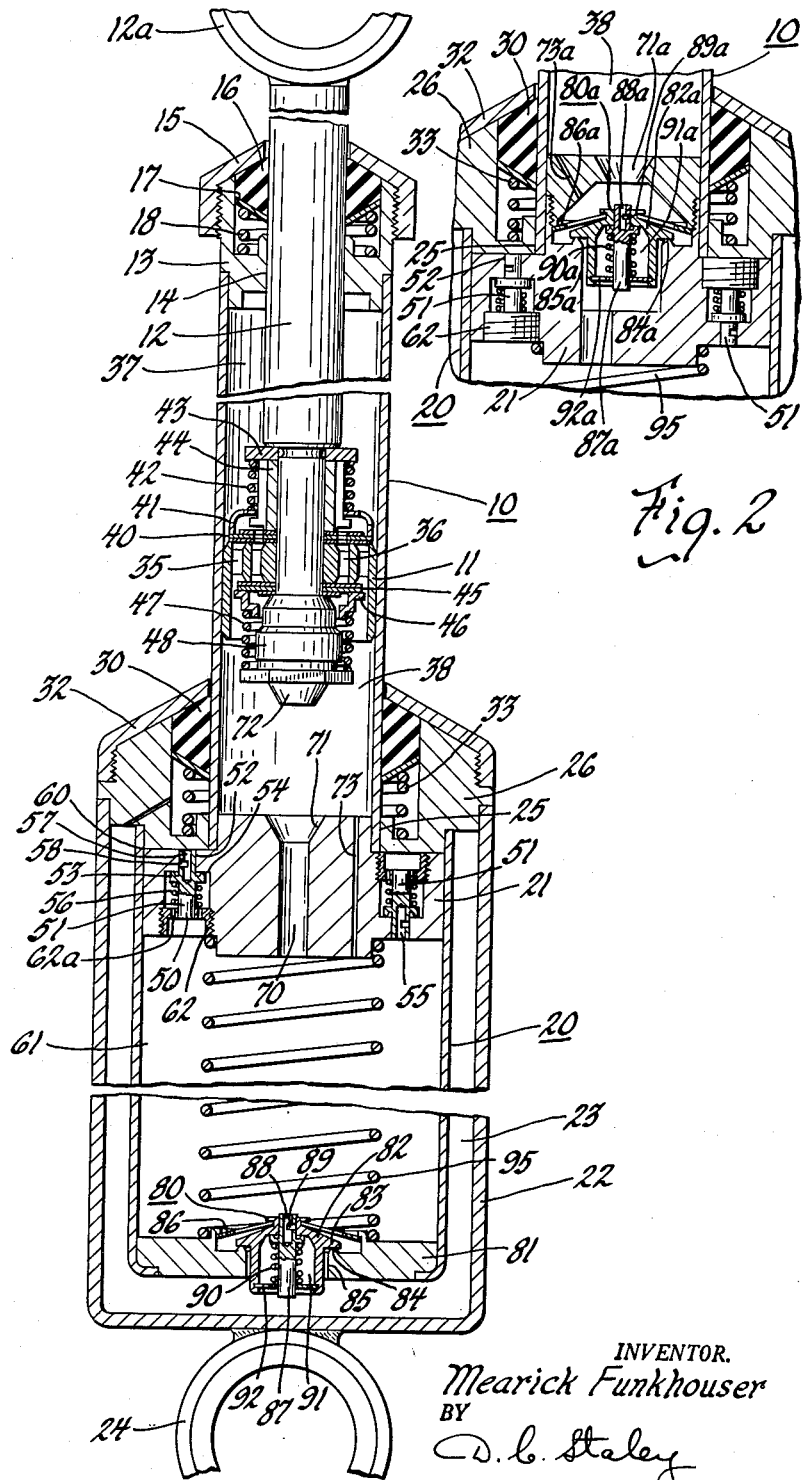
FIGURE 1 is a vertical cross-sectional view of a shock absorber incorporating features of this invention.
FIGURE 2 is a vertical cross-sectional view of a portion of the shock absorber of FIGURE 1 but illustrating a modified arrangement.

The shock absorber illustrated in the drawings is a direct-acting type shock absorber and consists of a first cylinder 10 and a second cylinder 20. The shock absorber also includes a first piston 11 and a second piston 21, the pistons 11 and 21 being reciprocable in the respective cylinders 10 and 20.

The cylinder 10 carries the piston 21 on the lower end thereof so that the cylinder and piston move as a unit when the piston 21 reciprocates in the cylinder 20. Thus, the cylinder 10 functions as a rod member supporting the piston 21. The piston 11 in the cylinder 10 is carried on the lower end of the rod member 12 that projects exteriorly of the cylinder and has a fitting 12a on the upper end thereof that is adapted to connect with a suitable fitting, not shown, on the chassis of a vehicle.

The shock absorber cylinder 20 is encircled by a cylindrical container 22 that is in spaced relationship relative to the cylinder 20 thereby forming a reservoir chamber 23 for hydraulic fluid between the cylinder 20 and the chamber 22. The lower end of the chamber 22 carries a fitting 24 that is adapted for connection to a fitting, not shown, on the running gear of the vehicle. Thus the shock absorber will be retained between the sprung mass or chassis of the vehicle and the unsprung mass or running gear by the fittings 12a and 24.

The shock absorber cylinder 10 has the upper end thereof closed by a wall member 13 having a bore 14 through which the rod 12 extends to guide the rod in its reciprocable movement in the cylinder. A closure cap 15 is positioned on the closure wall 13 and retains a seal member 16 of elastomeric material between the closure cap and a pressure member 17 retained against the seal member 16 by the compression spring 18.

The lower end of the cylinder 10 is fixedly secured to the piston 21 and passes through a bore 25 in a closure member 26 that closes the end of the cylinder 20 and is engaged by the chamber wall 22 so as to form the closure member for the reservoir chamber 23. Thus, the closure member 26, in effect, forms the guide for the cylinder 10 in its reciprocable movement in the cylinder 20. A seal member 30 of elastomeric material is carried in the closure member 26 and is retained in the seal chamber 31 by a closure cap 32. A compression spring 33 retains the seal member 30 under pressure to effect engagement with the wall of the cylinder 10.

The piston 11 of the small diameter cylinder 10 has a series of openings 35 positioned adjacent the circumference of the piston. A second series of openings 36 are positioned within the radial circle of the openings 35. The openings 35 and 36 provide for flow of hydraulic fluid between the chambers 37 and 38 on opposite sides of the piston 11.

The openings 35 are normally closed by an annular disk valve structure 40 held in engagement with the seats around the openings 35 by means of a valve retainer 41 and a compression spring 42 that is placed between the valve retainer and the washer 43 positioned at the upper end of the spacer member 44 disposed between the washer 43 and the disk valve assembly 40 to hold the disk valve assembly on the upper side of the piston 11.

A disk valve assembly 45 closes the series of openings 36, a valve retainer 46 holding the disk valve assembly 45 on the seats around the openings 36. A spring 47 urges the retainer 46 against the disk valve 45. The spring 47 is held on the lower end of the rod 12 by means of a nut 48 which nut also holds the entire piston and valve assembly on the lower end of the rod 12.

The piston member 21 that is carried on the lower end of the cylinder 10 is provided with one or more valve members 50 which control displacement of hydraulic fluid from the upper side of the piston 21 from the chamber space 60 into chamber space 61. Similarly, one or more valves 55 control displacement of the hydraulic fluid from the chamber space 61 to the chamber 60 above the piston 21. It will be noted that the valves 50 and 55 are of identical construction but are merely reversed in their direction of operation so as to control flow of hydraulic fluid between the chambers 60 and 61 in opposite directions. Valves 50 and 55 could be replaced by spring loaded disk valves similar to 40 and 45.

Each of the valves 50 and 55 consist of a valve member 51 that slides in a bore 52, an enlarged head 53 seating on a wall seat 54. The valve 51 is retained on the seat 54 by means of the compression spring 56. The valve member 51 has an axial bore 57 connecting with a radial bore or slot 58 so that when the valve 50, for example, is moved downwardly the slot 58 will move above the seal wall 54 and allow hydraulic fluid to pass through the passage 57, slot 58 and thence into the valve chamber 59 and through the openings 62a in the member 62 for flow of hydraulic fluid from the chamber space 60 into the chamber space 61.

Since valve member 55 is constructed like valve member 50, it operates in the same manner but controls flow of hydraulic fluid from the chamber space 61 into the chamber space 60.

The piston 21 has a central passage 70 that provides fluid connection between the chamber space 38 in the small diameter cylinder 10 and the chamber space 61 in the large diameter cylinder 20. This passage 70 is of sufficient size that there is substantially no restriction to flow of hydraulic fluid between the chambers 61 and 38.

It may be desirable to place a two-way valve similar to the base valve 80 in this passage 70, as illustrated in FIG. 2, with valve 80a.

As is apparent from the drawing, the area of piston 11 is smaller than the area of piston 21. Therefore, to smooth out the transition of control from the volume of fluid displaced by piston 11 to the volume of fluid displaced by both pistons 11 and 21, a valve 80a, like valve 80, may preferably be placed in passage 70. That is, with piston 11 doing the work as controlled by the resistance of the base valves 80—87, much less control will be required than when both pistons 11 and 21 are moving together. A tailored balance of control between the valve 80a in passage 70 and the base valves 80—87 can readily be established when it is desirable to divide the control between the base valve 80 and the similar valve 80a in passage 70.

The upper end of the passage 70 is in the form of a truncated cone 71. A projection 72 is provided on the head of the nut 48 and is also in the form of a truncated cone that cooperates with the truncated cone-shaped recess 71 to fit therein when the piston 11 moves downwardly to drive the piston 21 downwardly. The hydraulic fluid between the surfaces of the cone-shaped parts 71 and 72 will provide a hydraulic cushion between these parts at the time the two surfaces are brought into engagement, thus cushioning the shock of engagement and reducing the impact of engagement.

A restriction passage 73 connects the chambers 61 and 38 so that there will be a pressure balance between these chambers at all times even though the piston 11 is in engagement with the piston 21 and is driving the same, the cone-shaped part 72 closing the passage 70 at this time.

The larger diameter cylinder 20 carries a base valve 80 in the bottom wall 81 thereof, this valve providing for restrictive control of flow of hydraulic fluid from the chamber 61 to the reservoir 23 and relatively free flow of hydraulic fluid in the reverse direction. The valve 80 consists of a valve member 82 provided with a radial flange portion 83 that engages a seat 84 around the opening 85 in the wall 81. The valve member 82 is retained on the seat 84 by means of a light finger spring 86.

The valve member 82 carries a plunger valve 87 slidably supported in the member 82. This plunger valve has a central port 88 that connects with a radial port 89, the valve being held in the position shown in the drawing by a compression spring 90. When hydraulic fluid in the chamber 61 is placed under pressure, the plunger valve 87 will be moved downwardly against the action of the spring 90 until the radial slot 89 connects with the chamber 91 for restrictive control of flow of hydraulic fluid from the chamber 61 through the passage 88 and radial passage 89 into the valve chamber 91, and thence through openings 92 in the washer 93 for admission into the reservoir 23.

When the load is static, the several parts of the shock absorber assume their respective positions as shown in the drawing, compression spring 95 retaining the piston 21 against the closure wall 26.

In operation, the shock absorber piston 11 reciprocates in the cylinder 10 independently of the piston 21 in the cylinder 20 for a portion of the full stroke of the shock absorber allowed by the total length of the cylinder 10. When the shock absorber and the spring supported load are static, the piston 11 is disposed substantially midway between opposite ends of the cylinder 10. Thus, for a portion of the stroke of the shock absorber the piston 10 can operate independently of the piston 21. The resistance to displacement of hydraulic fluid between the chambers 37 and 38 at opposite sides of the piston 11 is controlled by the disk valve assemblies 40 and 45, this resistance to flow of displaced fluid being whatever may be desirable under the particular conditions of operation of the shock absorber.

When the shock absorber is under a compression stroke, that is piston 11 is moving toward the base valve 80, fluid is placed under pressure in the chambers 38 and 61 with sufficient fluid being displaced from the chamber 38 to chamber 37 to compensate for the movement of the piston 11 toward the base valve 80. However, there will be excess fluid that cannot be displaced from the chamber 38 into the chamber 37 because of the entry of the rod 12 into the chamber 37. This excess fluid will be displaced from the chamber 38 through the passage 70 into the chamber 61 and thence through the resistance valve 87 into the reservoir 23. When valve 80a is also used, as shown in FIG. 2, the displaced fluid works against the resistance valve 87a first and then against resistance valve 87. This valve 87 is modified by the action of valve 87a.

When the stroke of the shock absorber exceeds the distance provided between the piston 11 and the piston 21, the end portion 72 of the piston 11 will enter the recess 71 in the piston 21 to effect driving engagement of the piston 11 with the piston 21. During the interval of movement of the projection 72 into engagement with the surface of the recess 71, the film of hydraulic fluid between the respective surfaces will provide a fluid cushion or hydraulic cushion between the surfaces to soften the physical engagement of the projection 72 with the surface 71.

When the projection 72 on the pistons 11 engages the recess 71 in the piston 21, piston 21 will then be moved downwardly in the cylinder 20 to effect displacement of hydraulic fluid from the chamber 61 into the chamber 60 under control of the resistance valving 55. At this time no fluid will be displaced from the chamber 38 into the chamber 37 since relative movement between the piston 11 and the cylinder 10 has now come to a standstill. All additional stroke movement of the shock absorber will occur by movement of the piston 21 toward the base valve 80, piston 11, of course, moving toward the base valve concurrently with the piston 21 since the rod 12 is driving both pistons downwardly.

Since the piston 21 is of larger diameter than piston 11, the displacement of hydraulic fluid for a given movement between the sprung and unsprung masses will be greater than during movement of piston 11 in cylinder 10. At this time cylinder 10 functions as the rod for the piston 20 so that there is a volumetric differential of fluid that will be forced through the resistance valve 87 since downward movement of piston 21 displaces more fluid than can be received in chamber 60.

On the rebound stroke of the shock absorber, that is when pistons 21 and 11 move away from the base valve 80, fluid will be displaced from the chamber 60 through the resistance valve 50 into chamber 61, compression spring 95 urging the piston 21 upwardly to follow upward movement of the rod 12 that carries piston 11 and cylinder 10. When piston 21 reaches the position shown in the drawing, piston 11 will then move upwardly in the cylinder 10 independent of any connection with piston 21. All fluid required to refill the chambers 60 and 38 will be obtained from the reservoir 23 through the valve member 83 being lifted from its seat against the light finger spring 86, this return flow being relatively free, and in the case of FIG. 2, through valve member 83a. It will be understood, of course, that valves 53 and 45 will be effective to control relative movements between pistons 11 and 21 on this return stroke. A hydraulic cushion similar to that provided by the projection 72 and recess 71 can be provided between the head of piston 11 and the end closure wall 13.

From the foregoing description it will be apparent that the total length of a shock absorber providing the same stroke can be considerably less than if a uniform diameter cylinder is used since a part of the stroke of the shock absorber is effected under control of the large diameter piston 21. The portion of the full stroke of the shock absorber taken by the respective pistons 10 and 11 can be varied to meet requirements and the ratio of the diameters of the pistons 11 and 21 can be varied to control the maximum stroke of the shock absorber.

While the embodiments of the present invention as herein disclosed constitute a preferred form, it is to be understod that other forms might be adopted.

What is claimed is as follows:

1. A telescoping hydraulic shock absorber, comprising, first and second cylinders the first of which is reciprocable within the second, first and second pistons reciprocable in the second and first cylinders respectively, the first of which pistons is attached to said first cylinder for reciprocal movement therewith in said second cylinder and the second of which pistons is reciprocable in said first cylinder by rod means extending from the said first cylinder, said second piston being reciprocable independently of said first piston and engageable with said first piston to effect movement thereof therewith in the second of said cylinders, said cylinders having hydraulic connection between compression chamber portions thereof at comparable sides of the respective pistons for the cylinders, each of said pistons having valve means controlling flow of hydraulic fluid between opposite sides of the said pistons on compression and rebound stroke thereof as displaced by movement of the respective pistons, and closure means at one end of said second cylinder including valve means therein between the same and a hydraulic fluid reservoir means providing for controlled flow of hydraulic fluid to said reservoir means from either of the compression chambers of said cylinders as displaced on compression stroke by movement of either of said pistons and substantially free return of fluid from said reservoir to either of the said compression chambers on rebound stroke.

2. A telescoping hydraulic shock absorber, comprising, first and second cylinders the first of which is reciprocable within the second, first and second pistons reciprocable in the second and first cylinders respectively, the first of which pistons is attached to said first cylinder for movement therewith and the second of which pistons is reciprocable in said first cylinder by rod means extending from the said first cylinder, said second piston being reciprocable independently of said first piston and engageable with said first piston to effect movement thereof therewith in the second of said cylinders, said cylinders having free hydraulic connection between compression chamber portions thereof at comparable sides of the respective pistons for the cylinders through said first piston when said pistons are spaced from each other, valve means for each of said pistons controlling flow of hydraulic fluid between opposite sides of the respective pistons on compression and rebound stroke thereof as displaced by movement of the respective pistons, and closure means at one end of said second cylinder including valve means therein between the same and a hydraulic fluid reservoir means providing for controlled flow of hydraulic fluid to said reservoir means from either of the compression chambers of said cylinders as displaced on compression stroke by movement of either of said pistons and providing for relatively free return flow of hydraulic fluid from the reservoir means to either of said compression chambers of said cylinders on rebound stroke of said pistons.

3. A telescoping hydraulic shock absorber, comprising, first and second cylinders the first of which is reciprocable within the second, first and second pistons reciprocable in the second and first cylinders respectively, the first of which pistons is attached to said first cylinder for movement therewith and the second of which pistons is reciprocable in said first cylinder by rod means extending from the said first cylinder, said second piston being reciprocable independently of said first piston and engageable with said first piston to effect movement thereof therewith in the second of said cylinders, said cylinders having free hydraulic connection between compression chamber portions thereof at comparable sides of the respective pistons for the cylinders through said first piston until said second piston engages said first piston and closes said connection, valve means for each of said pistons for controlling flow of hydraulic fluid between opposite sides of the said pistons on compression and rebound stroke as displaced by movement of the respective pistons, and closure means at one end of said second cylinder including valve means for said second cylinder between the same and a reservoir means providing for controlled flow of hydraulic fluid to said reservoir means from either of the compression chambers of said cylinder as displaced on compression stroke by movement of either of said pistons and providing for relatively free return flow of hydraulic fluid from the reservoir means to either of said compression chambers of said cylinders on rebound stroke of said pistons, and additional passage means through said first piston providing hydraulic fluid connection between said compression chambers of said cylinders at all times to maintain thereby hydraulic pressure balance in the said cylinders during movement of the said pistons together.

4. A telescoping hydraulic shock absorber, comprising, first and second cylinders the first of which is reciprocable within the second, first and second pistons reciprocable in the second and first cylinders respectively, the first of which pistons is attached to said first cylinder for movement therewith and the second of which pistons is reciprocable in said first cylinder by rod means extending from the said first cylinder, said second piston being reciprocable independently of said first piston and engageable with said first piston to effect movement thereof in the second of said cylinders, each of said pistons having valve means therein respectively controlling flow of hydraulic fluid between opposite sides of the said pistons on compression and rebound stroke thereof as displaced by movement of the respective pistons, additional independently acting valve means in said first piston controlling flow of hydraulic fluid from the compression chamber of said first cylinder into the compression chamber of said second cylinder on displacement of fluid from said first cylinder by said second piston into said second cylinder and providing for relatively free return flow of hydraulic fluid from the compression chamber of said second cylinder into said first cylinder on rebound stroke of said second piston in said first cylinder, and additional valve means in said second cylinder providing controlled flow of hydraulic fluid from the compression chamber of either of said cylinders to reservoir means as displaced by movement of either or both of said pistons and providing relatively free return flow of hydraulic fluid from the reservoir means to the compression chambers of both of said cylinders.

5. A telescoping hydraulic shock absorber constructed and arranged in accordance with claim 3 that includes resilient means in said second cylinder normally positioning said first piston at the end of said second cylinder remote from the valved closure end thereof with said second piston being positioned intermediate the ends of said first cylinder under static conditions.

6. A telescoping hydraulic shock absorber, comprising, first and second cylinders one of which is reciprocable within the other, first and second pistons reciprocable in the first and second cylinders respectively, one of which pistons is attached to said one cylinder for movement therewith and the other of which pistons is reciprocable in said one cylinder by rod means extending from the said one cylinder, the said one cylinder providing rod means for said one piston attached thereto, the said pistons and their cooperating rod means providing for differential displacement of hydraulic fluid in their respective cylinders on reciprocation of the said pistons in their respective cylinders, valve means on each of said pistons controlling flow of hydraulic fluid between opposite sides of the said pistons as displaced by movement of the pistons in their respective cylinders, said cylinders having hydraulic connection between compression chamber portions thereof at comparable sides of the respective pistons for the cylinders positioned in said one piston and providing for free flow of hydraulic fluid between said compression chambers of said cylinders during reciprocation of said other piston independently of said one piston and which is closed when said one piston is engaged by said other piston for concurrent movement therewith, and means in said other cylinder providing for controlled flow of hydraulic fluid from both of said compression chambers of said cylinders to reservoir means on the shock absorber as displaced by movement of either of said pistons in their respective cylinders and providing for relatively free return flow of hydraulic fluid from the reservoir means to both of said compression chambers of said cylinders on movement of the respective pistons away from the said last-mentioned valve means.

References Cited in the file of this patent

UNITED STATES PATENTS

| | | |
|---|---|---|
| 1,780,659 | Wallace | Nov. 4, 1930 |
| 2,381,532 | Focht | Aug. 7, 1945 |
| 2,483,429 | Pierce | Oct. 4, 1949 |
| 2,695,079 | Brundrett | Nov. 23, 1954 |
| 2,819,064 | Peras | Jan. 7, 1958 |